May 17, 1960     N. J. TRBOJEVICH     2,936,678
METHOD OF GEAR SHAVING
Filed May 24, 1955
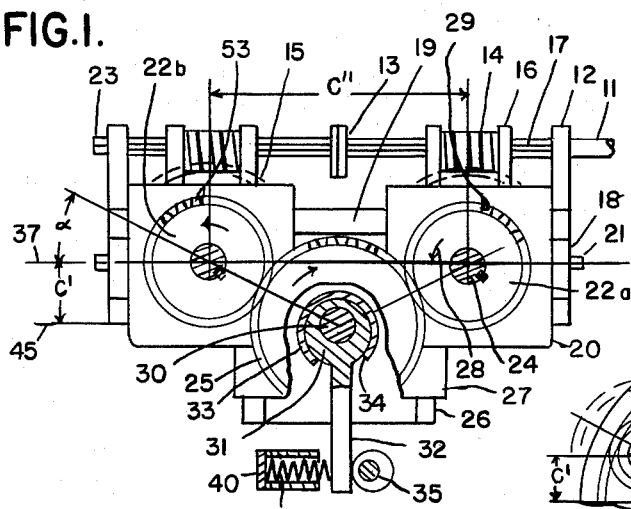
FIG.1.
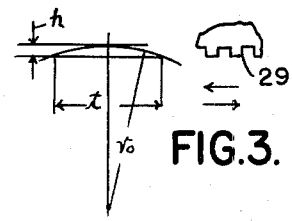
FIG.3.
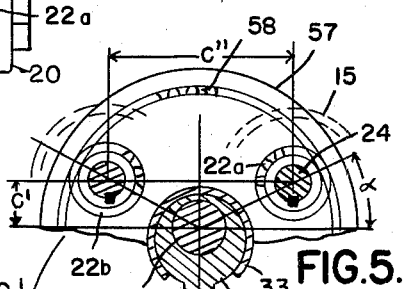
FIG.5.
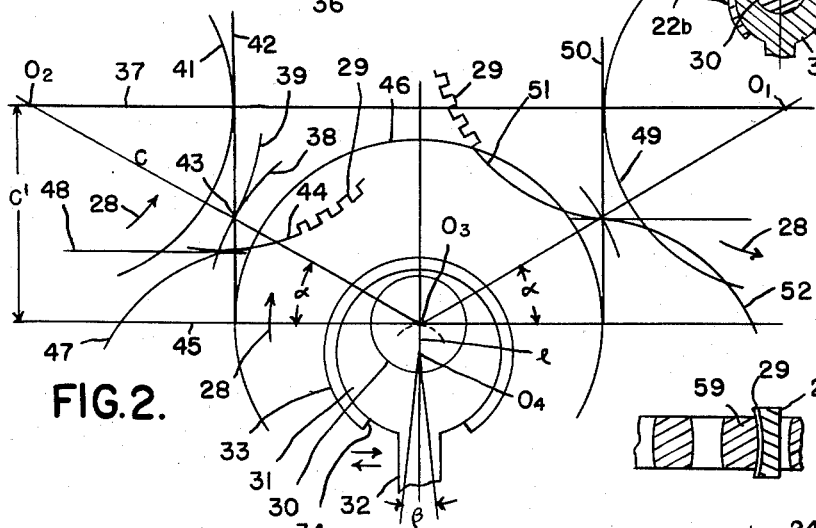
FIG.2.
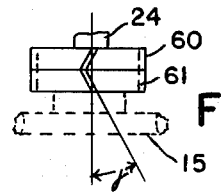
FIG.6.
FIG.7.
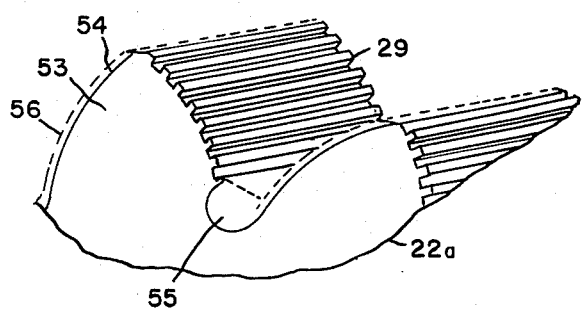
FIG.4.
INVENTOR.
Nikola J. Trbojevich

United States Patent Office 2,936,678
Patented May 17, 1960

2,936,678

METHOD OF GEAR SHAVING

Nikola J. Trbojevich, Detroit, Mich.

Application May 24, 1955, Serial No. 510,663

5 Claims. (Cl. 90—1.6)

The invention relates to a novel method, machine and cutters for gear shaving, but this application refers to the method alone.

At present, the method of "crossed axes" first discovered by R. S. Drummond, Patent No. 2,126,178 is universally used in gear shaving, but I conceived the idea of radically departing from that principle in order to accomplish certain operations for which the Drummond process is not very well suited.

In particular, I conceived the idea of producing a shaving action by rapidly changing the center distance between the blank and a serrated cutter while at the same time, again rapidly, rotating the said members in mesh. By this means thread-like chip filaments are produced similar to those generated by the said Drummond process. For this purpose I require a machine in which two cutters are used, in which the cutters may be positioned as required by this theory and in which the work may be vibrated by means of eccentrics, as it will be hereinafter shown.

The main object is to simplify the machine and the process by avoiding the use of tilted axes and resorting entirely to a co-planar operation of the members.

Another object is to simplify and cheapen the design, the manufacture and the method of resharpening of the cutters.

A further object is to preserve the tooth form and the method of positioning the cutters after resharpening.

Another object is to change the "operating pressure angle" at will and within a considerable range.

Further objects are to shave gears "close to a shoulder," to generate crowned teeth, herringbone gears, internal gears, helical gears having large helix angles, pinions having relatively few teeth and the like.

Another object is to regulate the thickness of generated teeth by a "spread blade" method instead of "jamming" as previously.

A further object is to generate spur gears by using spur cutters which could not be done prior to this invention.

Another object is to introduce a vibratory method of breaking, pulverizing and shedding-off the chips from the work and thereby producing a smoother finish.

Another object is to use cutters which have stronger teeth and are less liable to breakage. This is accomplished by using longitudinally disposed serrations at one side of the cutter teeth only. Such serrations are also much easier to manufacture than the crosswise serrations now used.

A further object is to construct a gear shaving machine which is better suited for a semi-automatic operation than the present types.

In the drawings:

Figure 1 shows the plan view of the new machine.

Figures 2 and 3 are geometrical diagrams explanatory of the method.

Figure 4 is a fragmentary view of the shaving cutter.

Figures 5, 6 and 7 are diagrammatic views showing the methods for generating internal gears, crowned gear teeth and herringbone gears respectively.

In Figure 1 the plan view of the machine is shown and is so drawn that all the elements comprising this method are identifiable in a single projection.

The machine is driven from an outside source of power from the right side of the drive shaft 11. This shaft consists of two portions which are severed in the middle and are joined there together by means of a releasable coupling 13 so that the left portion may be independently rotated by means of the hexagonal knob 23, for the purpose of adjustment.

The shaft 11 is supported by means of two bearings 12 which are affixed to the bed 18 of the machine and simultaneously engages two similar worms 14 by means of the splines 17 slidable in the boxes of the said worms. The latter are held in bearings 16 affixed to the movable aprons 20 which slide in the ways 19 formed on the top of the machine and are in mesh with two similar worm gears 15 rotatable in the said aprons.

The arbors 24 are integral with the said worm gears 15, see also Figure 7, and upon them the cutters 22a and 22b are keyed. The said cutters have a plurality of equispaced teeth 53 which are provided with the serrations 29 on one side of the teeth only, see also Figure 4, and are similar to each other in all respects except that one of the cutters is turned upside down. The said aprons 20 which contain the worm gears 15, the shafts or arbors 24 and the said cutters, are longitudinally adjustable by means of the end screws 21 to provide the exact center distance $C''$ as shown in the drawing. The cutters are also angularly adjustable by means of the knob 23 as already stated.

The bed 18 of the machine is a T-shaped casting and is provided with the already mentioned ways 19 in the longitudinal direction and the ways 26 at right angles thereto, preferably at a lower level.

The gear to be shaved or, as it may be briefly referred to, the blank 25 is mounted upon a freely rotatable arbor 30 which is housed in the corresponding bore of the eccentric 31, the latter again being rotatable in the main bearing 33. This whole assembly is mounted in the apron 27 which is relatively slidable and adjustable in any desired position to an exact distance $C'$ shown in the drawing, in the ways 26.

The eccentric 31 is formed integrally with a projecting arm 32 which is actuated by means of an eccentric or cam 35 and held in a tight position by means of an oppositely acting spring 36 held in a pot 40. In order that the said arm 32 may oscillate through a predetermined amount, the main bearing 33 is provided with a slot 34.

A peculiar feature of this machine is that the blank 25 is straddled and held in a tight position by means of two cutters, one on each side, that both cutters are rotated from the same source and always are in a strict synchronism. Thus, the worm 14 and the worm gear 15 at the left side of Figure 1 are to a certain extent redundant because the machine would still be operative even if the said worm and worm gear were removed and replaced by means of e.g. a brake. However, in order to achieve the greatest possible accuracy in the generated tooth curves and also to provide means for a semi-automatic operation, I reached the conclusion that the twin drive used in this machine is necessary for those purposes.

Another peculiarity of this machine is that the reciprocation effected by the eccentric 31 does not affect the constant velocity ratio existing among the cutters 22a and 22b and the blank 25. This is important. It is generally known that two mating involutes will correctly mesh at varying center distances, i.e. at various operating pressure angles. However, it is not so generally known or noticed that a transit from one pressure angle to another results in an increment or decrease of rotation during the period of the said variation whereby the constant velocity ratio is momentarily disturbed. I discovered that there is one and only one method of changing the certain distance without creating the said perturbation of the velocity ratio and that is: the center distance must be contracted or expanded in the direction of the tangents to mating involutes at the momentary points of contact. This is equivalent to saying that the direction of the reciprocation used in this method is perpendicular to the line of action. As it is well known, a gear tooth possesses two lines of action, one for each side of tooth, which cross each other at a point called the pitch point. Obviously, the direction of oscillation cannot be perpendicular to both said lines. Hence, I select only one line of action at one side of the blank 25 and another such line parallel to it, at the other side of the said blank. I position then the cutters 22a and 22b accordingly.

The geometry of this theory is shown in Figure 2.

Starting at the upper left corner of Figure 2, the cutter 22b rotates about the axis $O_2$, lying in the plane 37. It has a pitch circle 39, a base circle 41, a line of action 42, a pitch point 43, an involute 44 which is developed from the said base circle 41 in a counterclockwise sense and is provided with the serrations 29.

The blank 25 has an axis $O_3$ lying in the plane 45, a pitch circle 38, a base circle 46, a counterclockwise involute 47 in contact with the first said involute 44, a pitch point 43 and a line of action 42. The momentary tangent 48 is always perpendicular to the said line of action and travels upwardly as the rotation proceeds along the arrows 28. The operating pressure angle is denoted with the symbol $\alpha$, the center distance $O_2$, $O_3$ with the letter C and the distance between the planes 37 and 45 with C', the relation being:

$$C' = C \sin \alpha \qquad (1)$$

The conditions at the upper right corner of Figure 2 are similar to those just described and the elements are denoted with the numerals as follows: The axis of the cutter 22a is at $O_1$, the base circle 49 is tangent to the line of action 50 and the corresponding involutes 51 and 52 are now oriented clockwise. The distance between the two cutter axes $O_1$ and $O_2$ is denoted with C'', see Figure 1, and its exact value is:

$$C'' = 2C \cos \alpha \qquad (2)$$

The axis $O_4$ of the eccentric is at a distance $e$ from the axis $O_3$ of the blank and if a certain swing angle $\beta$ is imparted to the arm 32, the resulting length of the stroke through which the said blank is bodily translated in the direction of the tangents 48 to and fro is equal to $e\beta$.

In Figure 3, the width of the chip $t$ may be calculated from the following approximating formula:

$$t = \sqrt{8 r_0 h}$$

in which $r_0$ is the momentary radius of curvature of the involute and $h$ is the depth of cut.

In Figure 4, a portion of the cutter 22a is shown in perspective. The teeth 53, which may be either straight or helical, usually correspond in width to the width of the blank. The serrations 29 are disposed longitudinally of the teeth and, as already stated, are formed on one side of the teeth only. The opposite sides 54 of the teeth are left smooth and are continued downwardly into the curved faces 55 which provide the clearance space for various tools used in the manufacture. The dotted line 56 indicates the contour which would be required just to clear the opposing tooth in the blank.

In Figure 5 the method of shaving internal gears is illustrated and in view of what was already said, the diagram will be understood without difficulty. The "blank" now is the internal gear 57 while the remaining elements as indicated by the numerals are the same as before. In this connection just one remark is necessary: in this method the shaving of internal gears is much more difficult than the shaving of external types. There is much less room to affect the vibration of the work 57 as the tooth curves are concave. However, by using a very short stroke and serrations 29 of a fine pitch, the shaving operation can be accomplished.

In Figure 6 the method of producing crowned teeth 59 is suggested. The teeth of the cutter are made correspondingly hollow to conform with the desired convex curvature of the said teeth 59.

In Figure 7 a compound cutter comprising a right-hand helical section 60 having a helix angle $\gamma$ and a similar but left-handed section 61 mounted upon the arbor 24, is shown. This type of cutter is used for generation of herringbone gears.

What I claim as my invention is:

1. The method of gear shaving in which a rotary gear-like cutter having serrated teeth is rotated in mesh with a blank, in which the teeth of the said cutter and blank momentarily contact each other in a series of points all lying in a line of action and in which the blank is imparted a relative short-stroke reciprocation in a direction substantially perpendicular to the said line and in a plane forming a predetermined angle with the plane comprising the axes of said cutter and blank.

2. The method of shaving gears in which two similar rotary gear-like cutters having serrated teeth are rotated in unison with each other and in mesh with a blank, in which the teeth of the said cutters and blank contact in a plurality of points all lying in two parallel lines of action disposed at opposite sides of the said blank and in which the blank is imparted a relative short-stroke reciprocation in a direction perpendicular to the said lines.

3. As described in claim 2, the method in which the serrations are disposed longitudinally of the teeth of each cutter and at one side of the said teeth only.

4. As described in claim 2, the method in which the blank is reciprocated by mounting the same upon a freely rotatable spindle in a bore eccentrically formed in a bearing and oscillating the said bearing to and fro through a predetermined angle.

5. As described in claim 4, the method which further comprises providing the cutters with longitudinally extending cutting surfaces at one side only and mounting the two cutters so that such sides thereof respectively contact the sides of the blank.

References Cited in the file of this patent

UNITED STATES PATENTS

| | | |
|---|---|---|
| 1,154,830 | Alquist | Sept. 28, 1915 |
| 1,948,071 | Hofmann et al. | Feb. 20, 1934 |
| 2,309,530 | Perkins | Jan. 26, 1943 |
| 2,318,179 | Mentley | May 4, 1943 |
| 2,325,237 | Falk | July 27, 1943 |
| 2,658,259 | Aldino et al. | Nov. 10, 1953 |

FOREIGN PATENTS

| | | |
|---|---|---|
| 681,718 | Germany | Sept. 29, 1939 |